(12) United States Patent
Wade

(10) Patent No.: US 6,953,057 B2
(45) Date of Patent: Oct. 11, 2005

(54) AUTOMATIC TRANSMISSION SHIFT CONTROL SOLENOID AND VALVE

(75) Inventor: Richard A. Wade, Shelby, NC (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/682,080

(22) Filed: Oct. 10, 2003

(65) Prior Publication Data

US 2005/0076962 A1 Apr. 14, 2005

(51) Int. Cl.[7] ............................................. F15B 13/043
(52) U.S. Cl. .............. 137/625.64; 137/557; 137/625.61
(58) Field of Search ........................... 137/557, 625.61, 137/625.64

(56) References Cited

U.S. PATENT DOCUMENTS

| | | | | |
|---|---|---|---|---|
| 3,286,734 A | * | 11/1966 | Hartshorne | 137/625.64 |
| 4,590,968 A | * | 5/1986 | Wolfges | 137/625.64 |
| 4,966,195 A | * | 10/1990 | McCabe | 137/625.64 |
| 5,184,644 A | | 2/1993 | Wade | |
| 5,261,455 A | * | 11/1993 | Takahashi et al. | 137/625.64 |
| 6,382,248 B1 | * | 5/2002 | Long et al. | 137/625.64 |

* cited by examiner

*Primary Examiner*—Gerald A. Michalsky
(74) *Attorney, Agent, or Firm*—Kris Fredrick

(57) ABSTRACT

A control solenoid and valve includes a valve bodying having a magnetic assembly, hydraulic assembly, and a pressure regulation member. The magnetic assembly and pressure regulation member are formed respectively on offset axes preferably substantially parallel to one another. The hydraulic assembly exchanges forces created by the magnetic assembly and pressure regulation member. This design accomplishes a more compact arrangement. The pressure regulation member includes longitudinal cavity within the valve body situated on its corresponding axis. Within this cavity, a spool valve reciprocates relative to fluid pressure interacting with the spool valve and forces generated by the magnetic assembly. To accurately sense pressure of the fluid within this cavity and acting on the spool valve, a pressure sensor is positioned at an end of the longitudinal cavity bounded by an end of the spool valve. Thus, the pressure sensor is positioned away from fluid vortexes caused by reciprocating movement of the spool valve, and as a result, senses pressure with a high degree of accuracy.

19 Claims, 6 Drawing Sheets

AUTOMATIC TRANSMISSION SHIFT CONTROL SOLENOID AND VALVE

TECHNICAL FIELD

This disclosure relates to an automatic transmission shift control solenoid, and more particularly to the integration of a pressure sensor into an automatic transmission shift control solenoid.

BACKGROUND

The automotive automatic transmission has traditionally had a systematic fuel economy disadvantage compared to the manual shift transmission. Advances in control solenoid technology, however, have enhanced fuel economy and shift quality of automatic transmissions.

In automatic transmission systems, a gear shift typically occurs within about 300 msec. Much of this time is devoted to filling the clutch with fluid, and therefore, approximately, 70 msec is devoted to the shift from one gear to another. Pressure of the clutch fluid fluctuates according to shifting of the transmission, which is typically controlled by a proportional solenoid. That is, during shift, the pressure of the fluid contained by the clutch fluctuates as a result of the movement of the clutch. The rate of pressure fluctuation of the clutch fluid affects the way a passenger feels the actual shift. Complicating this matter further, the feel of the actual shift may change based on type of transmission system and automobile involved. For example, the subjective feel of a shift in a performance automobile is more apparent than the feel of shift in a luxury automobile.

FIG. 6 shows a conventional control valve 100 that may be deployed in an automatic transmission system. The control valve 100 regulates the flow of fluid from a supply chamber to an exhaust chamber relative to the pressure of fluid in the control chamber. The control valve 100 has a magnetic assembly including a solenoid 102 and actuator 114, which acts on a spool valve 104. The actuator 114 and spool valve reciprocate along the same axis 106. That is, movement of the solenoid 102 creates a force on the spool valve 104, and visa versa, as the components move along the same axis 106. As shown, the spool valve 104 and solenoid 102 are mechanically coupled but may be hydraulically coupled.

Conventionally, designers have incorporated a pressure sensor 108 in the flow path 110 between a conventional control valve 100 and the control chamber 112. In order to obtain a sufficiently short response time, the flow path 110 must be relatively short, i.e., in the range of 6 to 8 inches. This arrangement advantageously allows designers to incorporate a pressure sensor 108 into conventional designs to obtain more control over the switching characteristics of the automobile.

The conventional design has disadvantages. The physical layout of the pressure sensor and the control valve is limited to a relatively close arrangement. Further, the pressure sensor requires additional electronics to process sensed pressure to produce a signal, and relay the signal to electronics implemented relative to the control valve for adjustment. While the foregoing arrangement provides a response time sufficiently short for controlling free-wheeling clutches, a need exists to further enhance the shift quality and fuel economy of the transmission and car.

The foregoing and other objects, features, aspects and advantages of the disclosure will become more apparent from the following detailed description of the claims when taken in conjunction with the accompanying drawings.

SUMMARY

In order to control and enhance shift quality of a transmission, it is desirable to adjust and control the rate of pressure fluctuation over the 70 msec of actual shift time. The subject matter discussed herein provides numerous ways to substantially enhance shift quality, enhance fuel economy, and lower production cost. This is accomplished by uniquely locating a pressure sensor relative to a control solenoid, reconfiguring the arrangement of essential components of the control solenoid, and providing a unique wiring arrangement of the control solenoid and pressure sensor. Other unique features will become readily apparent.

The concepts address a control solenoid apparatus comprising a valve body having a first longitudinal cavity on a first axis, a second longitudinal cavity on a second axis, and a third longitudinal cavity traversing the first and second longitudinal cavities. A spool valve is slidably positioned in the first longitudinal cavity on the first axis wherein movement of the spool valve acts on a fluid contained in the third longitudinal cavity. A solenoid is positioned in the second longitudinal cavity, the solenoid having an actuator slidably positioned on the second axis wherein movement of the actuator acts on the fluid contained in the third longitudinal cavity. The first axis and the second axis are substantially parallel to one another. Also, a valve is arranged in an opening between the second longitudinal cavity and the third longitudinal cavity and is configured to communicate a force created by the movement of the actuator to the fluid contained in the third cavity.

Within the first longitudinal cavity, a cavity is bounded by a first end of the spool valve and an end of the first longitudinal cavity. In this cavity, a sensor is positioned for measuring pressure. The pressure sensor is configured to detect change of fluid pressure contained in the end cavity caused by movement of the spool valve.

Moreover, an electrical controller controls the solenoid. With a pressure sensor positioned relative to a first end of the first longitudinal cavity, the sensor may be connected to the same electrical controller for processing pressure readings.

The foregoing and other features, aspects, and advantages of the disclosure will become more apparent from the following detailed description of the present invention when taken in conjunction with the accompanying drawings.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION

Figure 1:
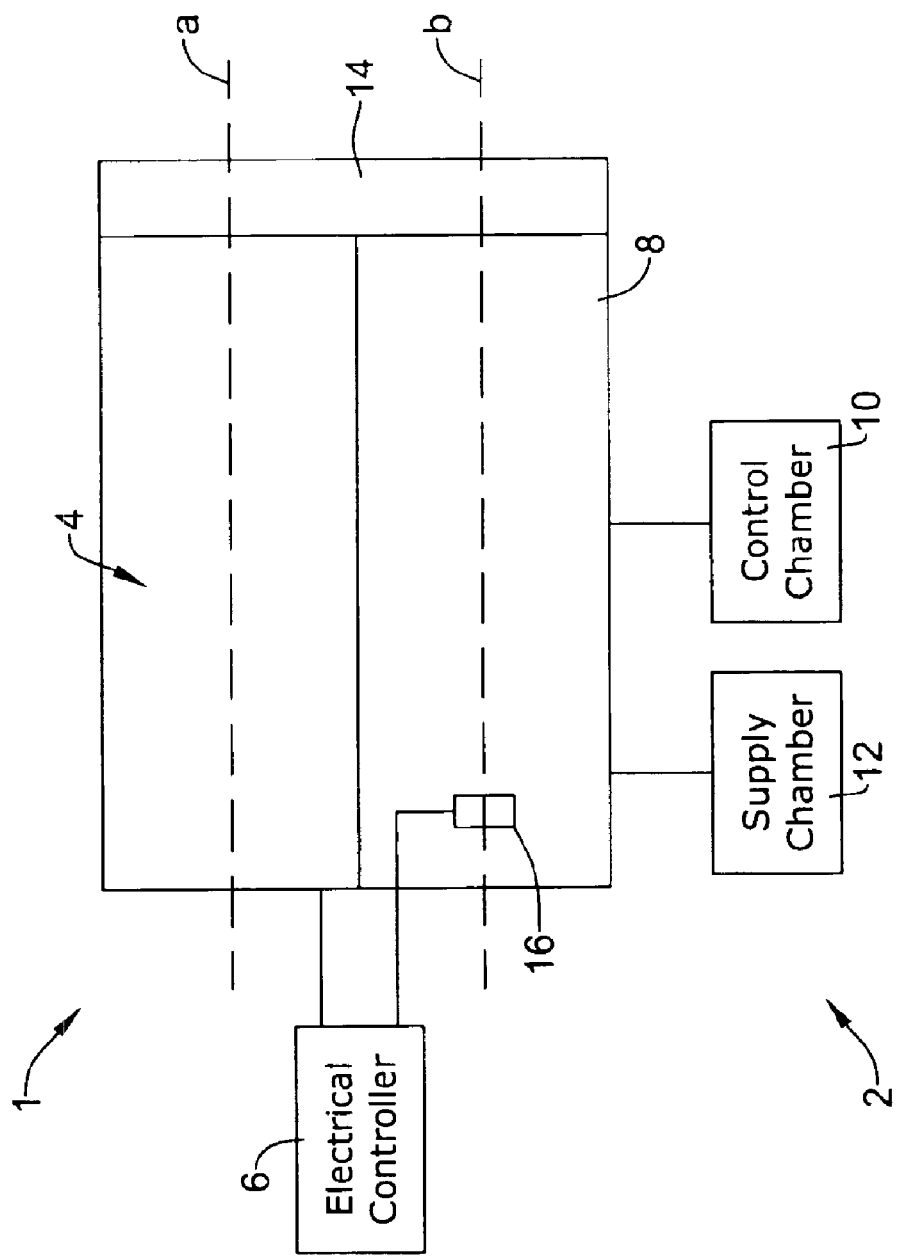
FIG. 1 is a high-level cross-sectional view of the automatic transmission shift control solenoid.

FIG. 1 depicts a high-level cross sectional view of a control valve 2, which includes a magnetic assembly 4 electrically responsive to a controller 6, a pressure regulation member 8 for regulating the pressure of fluid supplied from a control chamber 10 relative to a supply chamber 12, and a hydraulic assembly 14 transmitting forces created by the magnetic assembly 4 and the pressure regulation member 8 to one another.

In FIG. 1, the magnetic assembly 4 is arranged on axis a, and the pressure regulation member 8 is arranged on axis b. Axis a is offset from axis b. As illustrated, axes a and b are substantially parallel with one another. However, axes a and b may be angled depending on design constraints. Movable components of the magnetic assembly 4 and the pressure regulation member 8 reciprocate along axis a and b, respectively. By arranging magnetic assembly 4 and pressure regulation member 8 on separate axes a and b, a more compact arrangement can be accomplished. There is, however, a need to communicate axial movement of the magnetic assembly 4 to pressure regulation member 8 and visa-versa.

Hydraulic assembly 14 is configured to transfer a force created by axial movement of magnetic assembly 4 to pressure regulation member 8, and conversely, to transfer a force created by axial movement of the pressure regulation member 8 to the magnetic assembly 4. The hydraulic assembly 14 is disposed at a common end of magnetic assembly 4 and pressure regulation member 8. Advantageously, force generated by axial movement of the magnetic assembly 4 or pressure regulation member 8 is transferred to a respective end of the other assembly 4 or member 8.

Figure 6:
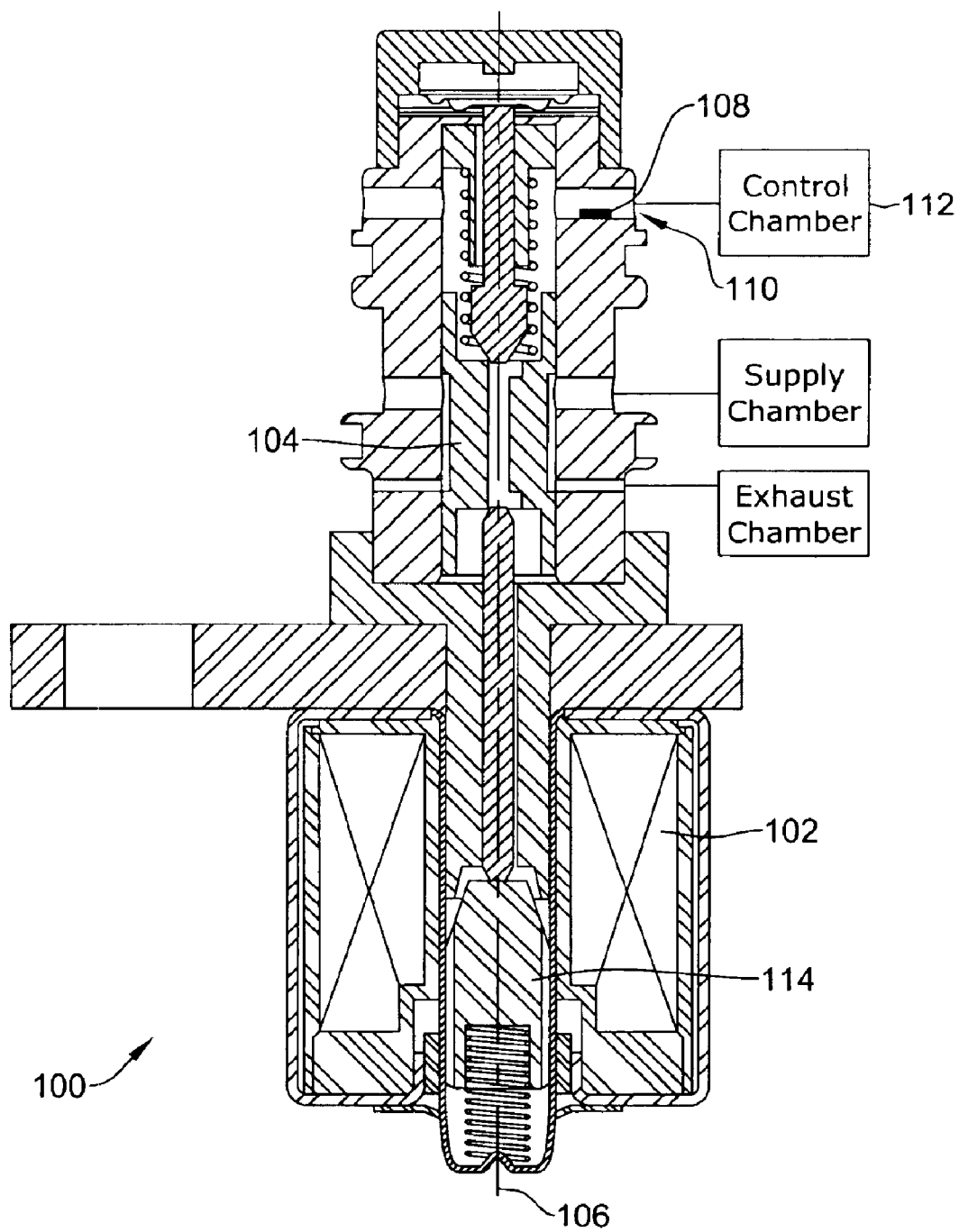
FIG. 6 shows a conventional arrangement of a control solenoid.

The magnetic assembly 4 and pressure regulation member 8 are functionally similar to the solenoid 102 and spool valve 104 of FIG. 6, respectively. However, the way these components are coupled to one another differ. FIG. 6 illustrates a direct coupled design whereas FIG. 1 illustrates a hydraulically coupled design. The movement and arrangement of magnetic solenoid 102 and spool valve 104 differ from the movement of components illustrated by FIG. 1 because the magnetic assembly 4 and pressure regulation member are on offset axes and are coupled by a hydraulic assembly 14.

The control valve 2 arrangement of FIG. 1 provides several advantages. The compact layout favors implementation into many types of automatic transmission systems. Further, as will become apparent in the following description, a pressure sensor 16 can be easily located within the pressure regulation member 8 to provide real time feedback and accurate measurement of pressure of the control chamber 10. Also, electronics (not shown) for processing signal(s) relayed by the pressure sensor 16 can be located near or incorporated within the same electronic packaging constituting controller 6. This packaging significantly reduces manufacturing costs and connection requirements, and provides substantially real time response to pressure sensed by the pressure sensor 16.

Figure 2:
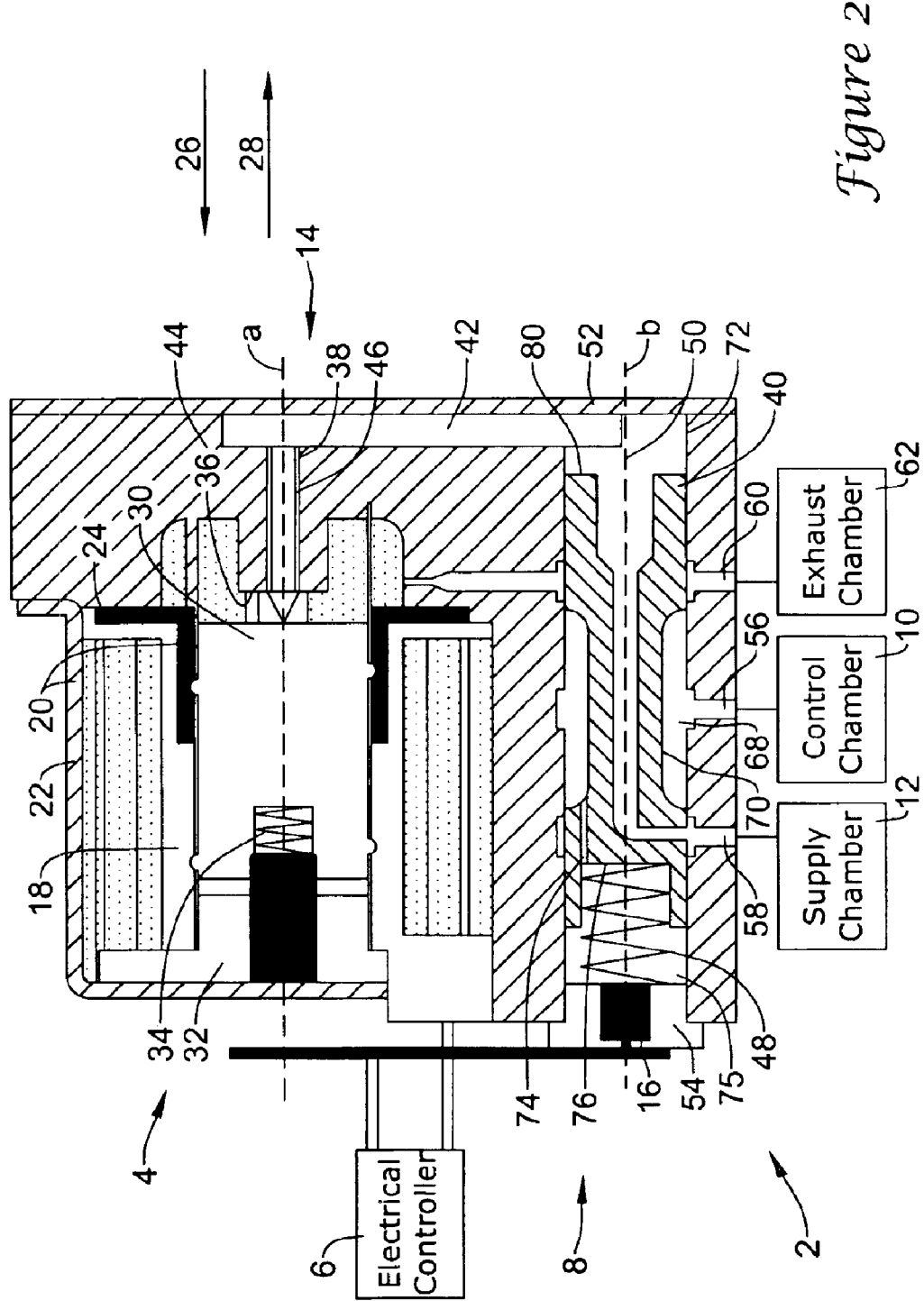
FIG. 2 is the cross-section view of FIG. 1 in greater detail.

FIG. 2 is a cross-sectional view of the control valve 2 of FIG. 1, shown in greater detail. The components of the magnetic assembly 4 and pressure regulation member 8 are known to those of ordinary skill in the art, but the depicted arrangement and movement of the components are unique and novel.

The magnetic assembly 4 consists of a bobbin 18, which is typically made of an insulating material, for example, plastic. The bobbin 18 encloses a coil (not shown) electrically connected to a power source supplied by the electrical controller 6. Electric potential supplied by electrical controller 6 to the bobbin coil creates a magnetic field. A magnetic circuit 20 surrounds the bobbin, and typically includes housing 22 and flux washer 24, each having high relative permeability. When a current is induced in the bobbin coil, the resulting magnetic field induces a magnetic flux that flows through magnetic circuit 20. A force is thereby generated in the direction of lowest permeability. In the control valve 2 of FIG. 2, the direction of lowest permeability is in the first axial direction 26.

As a result of this generated force, armature 30 is pulled toward pole piece 32. Armature spring 34 opposes the force generated by the magnetic flux and armature 30 in the second axial direction 28. Poppet valve 38 situated on the opposite side of the armature 30 maintains a variable force adding to the armature spring 34 force. Force balance is magnetic force opposed by spring and hydraulic force.

Electrical controller 6 supplies current to the bobbin coil (not shown) and the current may be varied to change the equilibrium point of the magnetic assembly 4. For example, increasing current creates an increasing magnetic field and, therefore, increasing magnetic flux and force in the first axial direction 26. In turn, armature 30 will move closer to the pole piece 32 while simultaneously moving farther from poppet seat 36. Poppet 46 of poppet valve 38 will, therefore, tend to follow the movement of armature 30, which will have a direct effect on pressure of fluid contained by hydraulic assembly 14.

The hydraulic assembly 14 includes poppet valve 38, which is hydraulically connected (fluidly coupled) to the spool valve 40. Hydraulic cavity 42 formed in valve body 44 contains fluid that interacts with poppet valve 38 and spool valve 40. In this way, movement of poppet 46 and the spool valve 40 acts on the fluid contained in the hydraulic cavity 42.

For example, movement of spool valve 40 in the first axial direction 26 causes a decrease of fluid pressure in the hydraulic cavity 42. As a result, the poppet 46 and armature 30 move in the second axial direction 28 relative to the expansion of armature spring 34. To put it another way, the spool is the slave driven by the poppet pressure. The poppet pressure is increased as the armature gets closer to the poppet. Similarly, increasing the current supplied to the magnetic assembly 4 causes an increasing force to be acting on armature 30 in the first axial direction 26. Thus, armature spring 34 contracts as the armature 30 moves in the first axial direction 26, and poppet 46 moves in the same direction. In turn, movement of the poppet 46 causes a decrease of fluid pressure in hydraulic cavity 42, and spool valve 40 moves in the second axial direction 28 as a result of decreased fluid pressure. With the foregoing arrangement, the magnetic assembly 4 and the pressure regulation member 8 may be oriented on distinct and offset axes a, b. The control valve 1 is, therefore, of a more compact arrangement. Other advantages become apparent.

Although, axes a and b are substantially parallel to one another, designers may angle axis a and b with respect to one another depending on spatial requirements of the control solenoid. Clever arrangements can place a significant distance between the spool and the poppet because the sensor is positioned relative to the spool.

The pressure regulation member 8 comprises spool valve 40 and a spool spring 48 for regulating the pressure of fluid from control chamber 10 relative to supply chamber 12. Spool valve 40 is contained by a generally cylindrical cavity 50 formed in valve body 44. The longitudinal axis of the cylindrical cavity 50 corresponds to axis b. Seal gasket 52 and stopper 54 seal each end of the cylindrical cavity 50.

Control port 56, supply port 58 and exhaust port 60 are fluidly coupled through valve body 44 to cylindrical cavity 50 and to the exhaust chamber 62. Both the supply port 60 and exhaust port 60 are controllably opened and closed by the axial movement of the spool valve 40.

Fluid from the control chamber 10 ("control fluid") enters a peripheral cavity 68 formed by groove 70 around the outer periphery of spool valve 40 and the wall 72 of the cylindrical cavity 50. Control fluid also flows through a feedback path 74 of the spool valve 40. The feedback channel 74 is a bore fluidly coupling an end cavity 75 at an end 76 of the spool valve 40 to peripheral cavity 68. As a result of control fluid entering end cavity 75, control fluid may act on the end 76 of spool valve 40.

Figure 3:
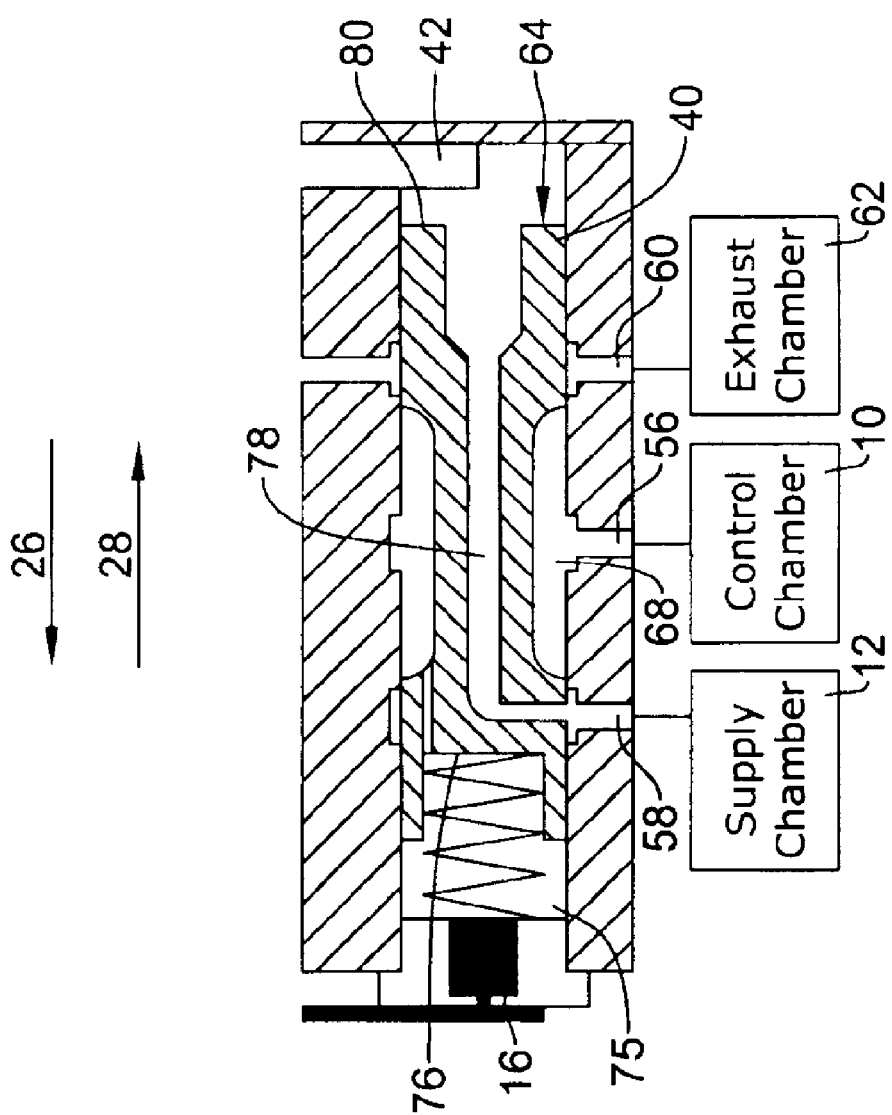
FIG. 3 depicts a spool valve in a first position.
Figure 4:
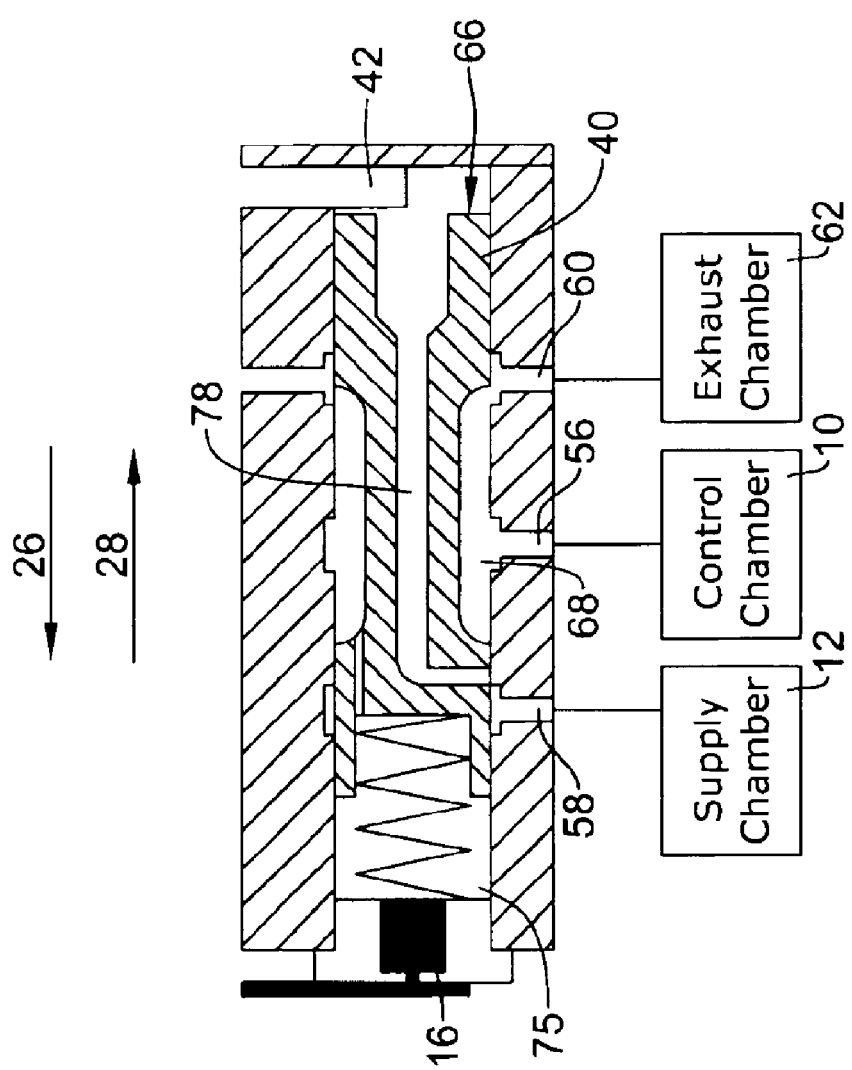
FIG. 4 shows the spool valve in a second position.

FIG. 3 shows the spool valve 40 forced to a maximum position in the first axial direction 26. FIG. 4 shows the spool valve 40 forced to a maximum position in the second axial direction 28.

As shown by FIG. 3, supply port 58 is fully open. In this first position 64, fluid from the supply chamber 12 flows into an inner spool cavity 78 of spool valve 40 and hydraulic cavity 42 communicating with the poppet valve 38 (FIG. 2). In addition, exhaust port 60 is completely closed by the spool valve 40. Therefore, control fluid does not exit the peripheral cavity 68 of cylindrical cavity 50.

As shown by FIG. 4, spool valve 40 completely closes the supply port 58 and completely opens the exhaust port 60. In this position 66, control fluid flows into peripheral cavity 68, end cavity 75 and exits through the exhaust port 60. Also, supply fluid is completely contained by the inner spool cavity 78 and hydraulic cavity 42, as the supply port 58 is completely closed. As a result, movement of the poppet 46 (FIG. 2) significantly affects the pressure of the supply fluid. For example, if armature 30 via hydraulic assembly 14 forces the spool valve 40 in the second axial direction 28, control fluid pressure increases by progressively closing exhaust 62. In order to compensate for this, controller 6 increases current, which in turn causes armature 30 to move in the first axial direction 26. The spool valve 40 will move in the second axial direction 28 causing control pressure to decrease.

When the pressure forces on each end 76, 80 of the spool valve 40 are not in balance, the spool valve 40 will move in an axial direction 26, 28 of least resistance. For example, when the control fluid pressure is higher than the force applied by poppet 46, the spool valve 40 will move in the second axial direction 28, and will progressively close the supply port 58 and open the exhaust port 60. The effect of this motion will cause the pressure in the control chamber 10 to drop. To compensate, controller 6 may decrease current, which will cause armature 30 to move in the second axial direction 28, increase pressure in hydraulic assembly 14, and cause spool valve 40 to move in the first axial direction 26. As the spool valve 40 moves to the first axial direction 26, the exhaust port 60 is increasingly closed and a supply port 58 is increasingly opened. In turn, the control fluid pressure increases.

Overall, the reciprocating movement of the spool valve 40 is a restoring force, which allows the spool valve 40 to adjust to changes in the system.

In another unique aspect, pressure sensor 16 position accommodates real time response without hindering, but increasing, accuracy of pressure readings. Desirably, the pressure sensor 16 should sense control fluid pressure away from a flow vortex created movement of spool valve 40. However, the position of the pressure sensor 16 needs to be positioned near spool valve 40 to sense the real-time dynamics of the systems. The position of pressure sensor 16 cannot disturb the system it is measuring. Such a disturbance (altering fluid flow) would cause errors in the measured pressure, which is a problem in conventional placement (FIG. 6). Further, it is undesirable to position the pressure sensor 16 too far away from the system, as the signal generated by the pressure sensor 16 would be dampened thereby not giving a real time response.

As gearshifting, which includes filling a clutch with fluid, occurs in approximately 300 msec, whereas mechanical shifting occurs in 70 msec, the spool valve 40 reciprocates from one end to another very rapidly. Such a rapid movement transfers the fluid from the control chamber 10 contained in the cylindrical cavity 50 at tremendous velocity. This creates significant amounts of fluid vortexes as a result of the movement of the spool valve 40. A pressure sensor situated in the region of high fluid velocity and vortex will not accurately detect and sense the pressure of the fluid contained by the control chamber 10. In conventional designs, the pressure transducer is positioned between the control chamber 10 and the control valve 1 to sense the pressure of the fluid contained by the control chamber 10.

Advantageously, the control valve 2 discussed herein positions a pressure sensor 16 away from high fluid velocities and fluid vortexes. This has several advantages. First, the pressure sensor detects fluid pressure contained by the control chamber 10 at a greater accuracy. Second, response time to the sense pressure may be increased. To obtain better pressure readings, the pressure sensor 16 is positioned at an end of the cylindrical cavity, as shown by FIGS. 1–5.

Figure 5:
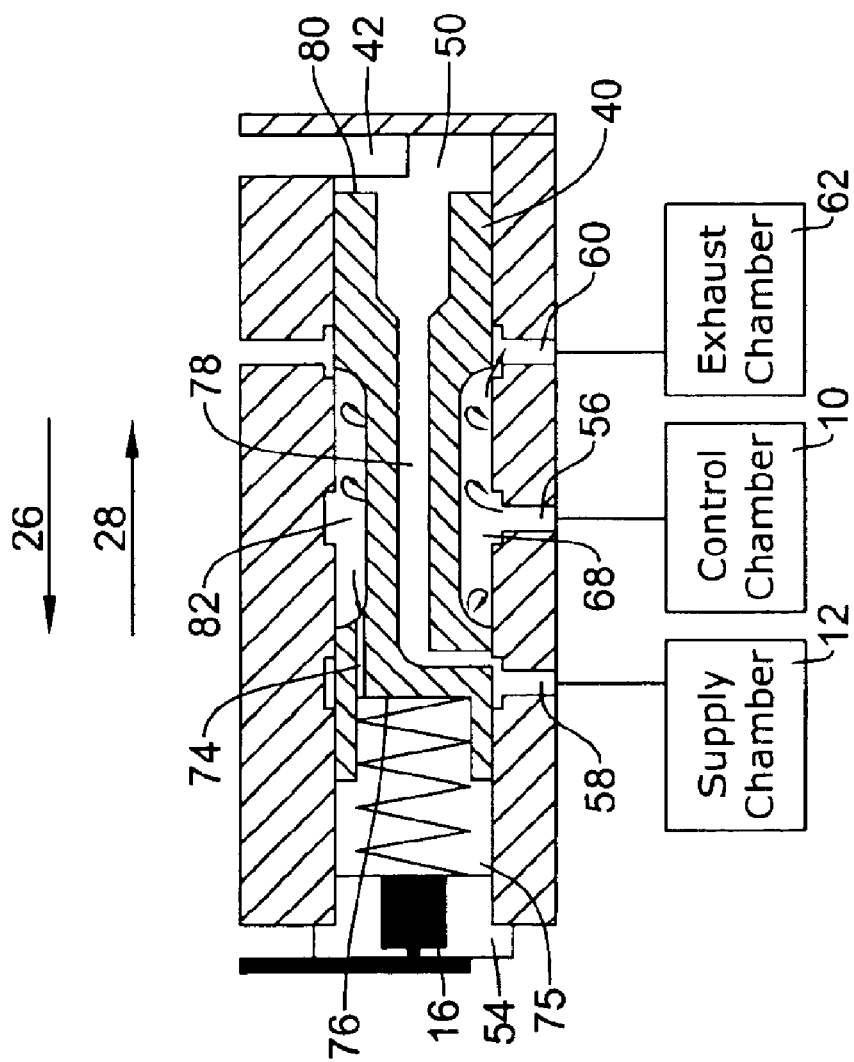
FIG. 5 depicts the spool valve between the first and second position.

FIG. 5 depicts the spool valve moving from the first position 64 (FIG. 3) to the second position 66 (FIG. 4) and fluid disturbances caused by the movement of spool valve 36. As in FIG. 5, control fluid enters the cylindrical cavity 50, end cavity 75, and surrounds the spool valve 40. When the spool valve 40 moves in the second axial direction 28, progressively closing the supply port 58 and opening the exhaust port 60, a fluid disturbance 82 is created in peripheral cavity 68. This disturbance 82 is caused by the movement of spool valve 40, control fluid entering by way of the control port 56, exiting by way of the exhaust port 60, and flowing through feedback channel 74. Control fluid acting on the second end 76 of the spool valve 40 experiences minimal fluid disturbances, however, as there are only one entrance and exit via the feedback channel 74. Further, the control fluid contained by end cavity 75 corresponds to the pressure acting on and forcing the spool valve 40 in the second axial direction 28. By placing the pressure sensor 16 in the stopper 54 at the second end of the cylindrical cavity 50, more accurate pressure readings may be obtained. The volume bounded by the spool and the second end of the cylindrical cavity is small, which also increases response time.

FIG. 5 also depicts spool valve 40 moving in the opposite direction, i.e., in the first axial direction 26. Fluid flows from end cavity 75 through the feedback channel 74, and into the peripheral cavity 68. Flow disturbance gradients 82 change. In this situation, the exhaust port 60 progressively closes, whereas the supply port 58 is progressively opened. Poppet valve 38 creates an over-pressure situation, forcing the spool valve 40 in the first axial direction 26, and creating significant control fluid disturbances, which are a result of progressively closing exhaust port 60 and movement of spool valve 40. Also, in this situation, control fluid flows through the feedback channel 74 in the second axial direction 28. However, the control fluid acting on the second end 76 of the spool valve does not experience significant disturbance. As a result, reciprocation of the spool valve 40 does not affect the control fluid acting on the second end 76 of the spool valve 50. Ideally, placement of the pressure transducer 16 can accurately sense the pressure of the fluid contained by the control chamber. Pressure readings may be affected by the waterhammer effect, i.e., the spool being driven to the stop during the fill phase. The waterhammer effect causes a predictable spike which may be programmed to be ignored.

Referring again to FIG. 2, pressure transducer 16 is positioned relative to the electronics (not shown) housed by controller 6 for controlling the magnetic assembly 4. This configuration reduces signal transmission time. As another advantage, electronics for processing the detected pressure from the pressure transducer 16 and electronics controlling the magnetic assembly 4 may be incorporated onto a common ASIC. As illustrated by FIG. 2, in the simplest form, the electronics (electrical controller 6) processes the pressure signal and determines if the pressure is adequate to provide shift quality required. If not at the correct pressure, the ASIC changes the magnitude of current applied to the magnetic assembly 4. This process is repeated for every event.

Although the present disclosure has been presented in detail, it is to be clearly understood that the same is by way of illustration and example only and is not to be taken by way of limitation, the scope of the present invention being limited only by the terms of the appended claims.

What is claimed is:

1. A control solenoid apparatus comprising:
   a valve body having a first longitudinal cavity on a first axis, a second longitudinal cavity on a second axis different from the first axis, and a third longitudinal cavity traversing the first and second longitudinal cavities;
   a spool valve slidably positioned in the first longitudinal cavity, and wherein movement of the spool valve acts directly on a fluid contained in the third longitudinal cavity wherein a first end of the spool valve and an of the first longitudinal cavity define an end cavity;
   a pressure sensor for sensing pressure in the end cavity; and
   a solenoid positioned adjacent or in the second longitudinal cavity, the solenoid having an actuator slidably positioned on the second axis, and wherein movement of the actuator acts directly on the fluid contained in the third longitudinal cavity and moves the spool valve along the first longitudinal cavity.

2. The apparatus according to claim 1, wherein the first axis and the second axis are substantially parallel to one another.

3. The apparatus according to claim 1, further comprising:
   a valve arranged in an opening between the second longitudinal cavity and the third longitudinal cavity, and configured to communicate a force created by the movement of the actuator to the fluid contained in the third cavity.

4. The apparatus according to claim 1, wherein the pressure sensor is configured to detect change of fluid pressure contained in the end cavity caused by movement of the spool valve.

5. The apparatus according to claim 1, wherein the valve housing further comprises a supply port, a control port, and an exhaust port, each being fluidly coupled to the first longitudinal cavity.

6. The apparatus according to claim 5, wherein the movement of the spool valve in a first direction progressively opens the supply port and closes the exhaust port and movement of the spool valve in a second direction progressively closes the supply port and opens the exhaust port.

7. The apparatus according to claim 5, wherein the fluid from the control port flows in and out of the end cavity in response to movement of the spool valve.

8. The apparatus according to claim 7, wherein the spool valve is shaped generally to conform to a shape of a wall bounding the first longitudinal cavity, the spool valve having a groove in its outer surface forming a peripheral cavity bounded by a surface of the groove and the wall of the first longitudinal cavity.

9. The apparatus according to claim 8, wherein the end cavity and peripheral cavity are fluidly coupled to one another.

10. The apparatus according to claim 9, wherein the control port is fluidly coupled to the peripheral cavity.

11. The apparatus according to claim 8, wherein the spool valve comprises a feedback channel fluidly coupling the end cavity and the peripheral cavity to one another.

12. The apparatus according to claim 8, wherein the exhaust port is variably and fluidly coupled to the peripheral cavity.

13. The apparatus according to claim 12, wherein movement of the spool valve in a first direction progressively closes the exhaust port with respect to the peripheral cavity and movement of the spool valve in a second direction progressively opens the exhaust port with respect to the peripheral cavity.

14. The apparatus according to claim 1, wherein the spool valve further comprises:
   an inner longitudinal cavity formed in the spool valve having a first open end at an end of the spool valve enabling fluid flow between the inner longitudinal cavity and the third longitudinal cavity.

15. The apparatus according to claim 14, wherein movement of the spool valve in a first direction causes the fluid to flow from the inner longitudinal cavity to the third longitudinal cavity and vice-versa.

16. The apparatus according to claim 1, further comprising an electrical controller electrically connected to the solenoid.

17. The apparatus according to claim 16, wherein the pressure sensor connects to the electrical controller for processing pressure readings.

18. A control solenoid apparatus comprising:
   a valve body having a first longitudinal cavity on a first axis, a second longitudinal cavity on a second axis different from the first axis, and a third longitudinal cavity traversing the first and second longitudinal cavities;
   a spool valve slidably positioned in the first longitudinal cavity, and wherein movement of the spool valve acts directly on a fluid contained in the third longitudinal cavity, wherein a first end of the spool valve and an end of the first longitudinal cavity define an end cavity;
   a pressure sensor for sensing pressure in the end cavity; and
   a solenoid positioned adjacent or in the second longitudinal cavity, the solenoid having an actuator slidably positioned on the second axis, and wherein movement of the actuator acts directly on the fluid contained in the third longitudinal cavity and moves the spool valve along the first longitudinal cavity;
   wherein the spool valve moves in an inverse proportional relationship with the actuator.

19. The apparatus according to claim 18, wherein movement of the actuator in a first axial direction causes a change in fluid pressure in the third longitudinal cavity, which causes the spool valve to move in a second axial direction.

* * * * *